United States Patent
Funaya (10) Patent No.: US 11,037,324 B2
(45) Date of Patent: Jun. 15, 2021

(54) SYSTEMS AND METHODS FOR OBJECT DETECTION INCLUDING Z-DOMAIN AND RANGE-DOMAIN ANALYSIS

(71) Applicant: Toyota Research Institute, Inc., Los Altos, CA (US)

(72) Inventor: Hiroyuki Funaya, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 181 days.

(21) Appl. No.: 16/422,454

(22) Filed: May 24, 2019

(65) Prior Publication Data

US 2020/0372670 A1    Nov. 26, 2020

(51) Int. Cl.
*G06T 7/73* (2017.01)
*G06T 7/521* (2017.01)

(52) U.S. Cl.
CPC ............. *G06T 7/73* (2017.01); *G06T 7/521* (2017.01); *G06T 2207/10028* (2013.01); *G06T 2207/10052* (2013.01)

(58) Field of Classification Search
None
See application file for complete search history.

(56) References Cited

U.S. PATENT DOCUMENTS

| | | | |
|---|---|---|---|
| 7,187,452 B2 * | 3/2007 | Jupp | G01S 7/497 356/501 |
| 10,509,847 B1 * | 12/2019 | Xu | G06F 17/18 |
| 10,826,786 B2 * | 11/2020 | Eckart | G06F 16/2246 |
| 2006/0241900 A1 * | 10/2006 | Hu | G06K 9/6284 702/179 |
| 2019/0311532 A1 * | 10/2019 | Doemling | G06F 17/18 |

OTHER PUBLICATIONS

Li et al., "An Improved RANSAC for 3D Point Cloud Plane Segmentation Based on Normal Distribution Transformation Cells," Remote Sens. 2017, 9, 433, May 3, 2017.
Magnusson, et al., "Scan Registration for Autonomous Mining Vehicles Using 3D-NDT," 2007, found at http://130.243.105.49/Research/MRO/publications/2007/Magnusson_etal_2007-JFR-3D_Scan_Registration_for_Autonomous_Mining_Vehicles.pdf.

(Continued)

*Primary Examiner* — Nancy Bitar
(74) *Attorney, Agent, or Firm* — Christopher G. Darrow; Darrow Mustafa PC (57) ABSTRACT

Systems and methods described herein relate to detecting objects. One embodiment receives a plurality of three-dimensional (3D) data points from a plurality of light beams emitted by one or more sensors; identifies, among the plurality of 3D data points, a first set of inlier points that satisfy a first predetermined error condition with respect to a plane hypothesis and a first set of outlier points that fail to satisfy the first predetermined error condition; identifying, among the first set of inlier points, a second set of outlier points, the second set of outlier points failing to satisfy a second predetermined error condition in a range domain with respect to a plurality of line hypotheses corresponding, respectively, to the plurality of light beams; and detecting an object based, at least in part, on at least one of the first set of outlier points and the second set of outlier points.

17 Claims, 7 Drawing Sheets

(56) References Cited

OTHER PUBLICATIONS

Cheng et al., "Registration of Laser Scanning Point Clouds: A Review," 2018, found at https://pdfs.semanticscholar.org/c1d5/e5d17729e543f0faaca4fe44234118ce2ec1.pdf.

Stoyanov et al., "On the Accuracy of the 3D normal Distributions Transform as a Tool for Spatial Representation," 2011, found at https://www.researchgate.net/publication/221071201_On_the_Accuracy_of_the_3D_Normal_Distributions_Transform_as_a_Tool_for_Spatial_Representation.

Magnusson, "The Three-Dimensional Normal Distributions Transform—an Efficient Representation for Registration, Surface Analysis, and Loop Detection", (PhD dissertation). Örebro University, School of Science and Technology found at http://urn.kb.se/resolve?urn=urn:nbn:se:oru:diva-8458, Oct. 2009.

Zeineldin, et al. Fast and accurate ground plane detection for the visually impaired from 3D organized point clouds, IEEE Technically Sponsored SAI Computing Conference, Jul. 2016, accessed at: https://www.researchgate.net/publication/307572427.

\* cited by examiner

SYSTEMS AND METHODS FOR OBJECT DETECTION INCLUDING Z-DOMAIN AND RANGE-DOMAIN ANALYSIS

TECHNICAL FIELD

The subject matter described herein relates in general to machine vision and more specifically to systems and methods for detecting objects.

BACKGROUND

An important aspect of robotics is machine vision. For example, autonomous vehicles need to be able to sense the surrounding environment (e.g., roadway, obstacles, etc.) and navigate autonomously without human input or at least partially without human input. In some applications, a robot such as an autonomous vehicle needs to be able to detect small objects that may be difficult to differentiate from the surrounding ground plane. Current machine-vision systems are not always effective at detecting such small objects.

SUMMARY

An example of a system for detecting objects is presented herein. The system comprises one or more sensors that emit a plurality of light beams, one or more processors, and a memory communicably coupled to the one or more processors. The memory stores a data-analysis module including instructions that when executed by the one or more processors cause the one or more processors to receive a plurality of three-dimensional (3D) data points from the plurality of light beams. The data-analysis module also includes instructions to identify, among the plurality of 3D data points, a first set of inlier points and a first set of outlier points, the first set of inlier points satisfying a first predetermined error condition with respect to a plane hypothesis, the first set of outlier points failing to satisfy the first predetermined error condition. The data-analysis module also includes instructions to identify, among the first set of inlier points, a second set of outlier points, the second set of outlier points failing to satisfy a second predetermined error condition in a range domain of the one or more sensors with respect to a plurality of line hypotheses corresponding, respectively, to the plurality of light beams. The memory also stores an object-detection module including instructions that when executed by the one or more processors cause the one or more processors to detect an object based, at least in part, on at least one of the first set of outlier points and the second set of outlier points.

Another embodiment is a non-transitory computer-readable medium for detecting objects and storing instructions that when executed by one or more processors cause the one or more processors to receive a plurality of three-dimensional (3D) data points from a plurality of light beams emitted by one or more sensors. The instructions also cause the one or more processors to identify, among the plurality of 3D data points, a first set of inlier points and a first set of outlier points, the first set of inlier points satisfying a first predetermined error condition with respect to a plane hypothesis, the first set of outlier points failing to satisfy the first predetermined error condition. The instructions also cause the one or more processors to identify, among the first set of inlier points, a second set of outlier points, the second set of outlier points failing to satisfy a second predetermined error condition in a range domain of the one or more sensors with respect to a plurality of line hypotheses corresponding, respectively, to the plurality of light beams. The instructions also cause the one or more processors to detect an object based, at least in part, on at least one of the first set of outlier points and the second set of outlier points.

Another embodiment is a method of detecting objects, the method comprising receiving a plurality of three-dimensional (3D) data points from a plurality of light beams emitted by one or more sensors; identifying, among the plurality of 3D data points, a first set of inlier points and a first set of outlier points, the first set of inlier points satisfying a first predetermined error condition with respect to a plane hypothesis, the first set of outlier points failing to satisfy the first predetermined error condition; identifying, among the first set of inlier points, a second set of outlier points, the second set of outlier points failing to satisfy a second predetermined error condition in a range domain of the one or more sensors with respect to a plurality of line hypotheses corresponding, respectively, to the plurality of light beams; and detecting an object based, at least in part, on at least one of the first set of outlier points and the second set of outlier points.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The embodiments described herein improve on current machine-vision systems for object detection by detecting objects whose z-domain vertical height relative to a ground plane is relatively small. For example, some embodiments are capable of detecting objects whose vertical height is only 1 or 2 cm, when the precision of the sensors is sufficiently high and the surrounding ground is sufficiently flat, which is often the case with paved roads and contemporary Light Detection and Ranging (LIDAR) sensors. Current machine-vision systems have difficulty detecting such small objects (e.g., beverage cans, small animals' dead bodies, pot holes, etc.), yet for safety reasons, it can be important for a robot such as an autonomous vehicle to detect small objects on a roadway.

At least some of the embodiments described herein operate on a plurality of three-dimensional (3D) data points from a plurality of light beams emitted by one or more sensors. In some embodiments, the sensors include one or more LIDAR sensors, and the 3D data points obtained from multiple synchronized sensors constitute a point cloud.

One embodiment processes the 3D data points in two stages. In the first stage, the system classifies the points as inliers—points that lie in a hypothesized ground plane—and outliers—points that do not lie in the hypothesized ground plane. This determination is based on detecting the difference in the z-domain (vertical height relative to a ground plane) between the inliers and outliers. In the second stage, the system further processes the inliers from the first stage to identify points within each beam that are outliers in the range domain (the direct line-of-sight distance from the sensor to the object). In some embodiments, a line hypothesis is formed for each beam, and the points in the beam are compared to the line hypothesis to identify the outliers, if any, in that beam. The outliers found in the first and second stages (in the z domain and range domain, respectively) can both be considered to detect objects on the ground—even small objects. The analysis in the range domain can detect objects that would otherwise be missed from analyzing only the z-domain data.

In some embodiments, the z-domain and range-domain processing involving a plane hypothesis and per-beam line hypotheses, respectively, are performed iteratively in accordance with a joint z-domain and range-domain random sample consensus (RANSAC) algorithm.

Figure 1:
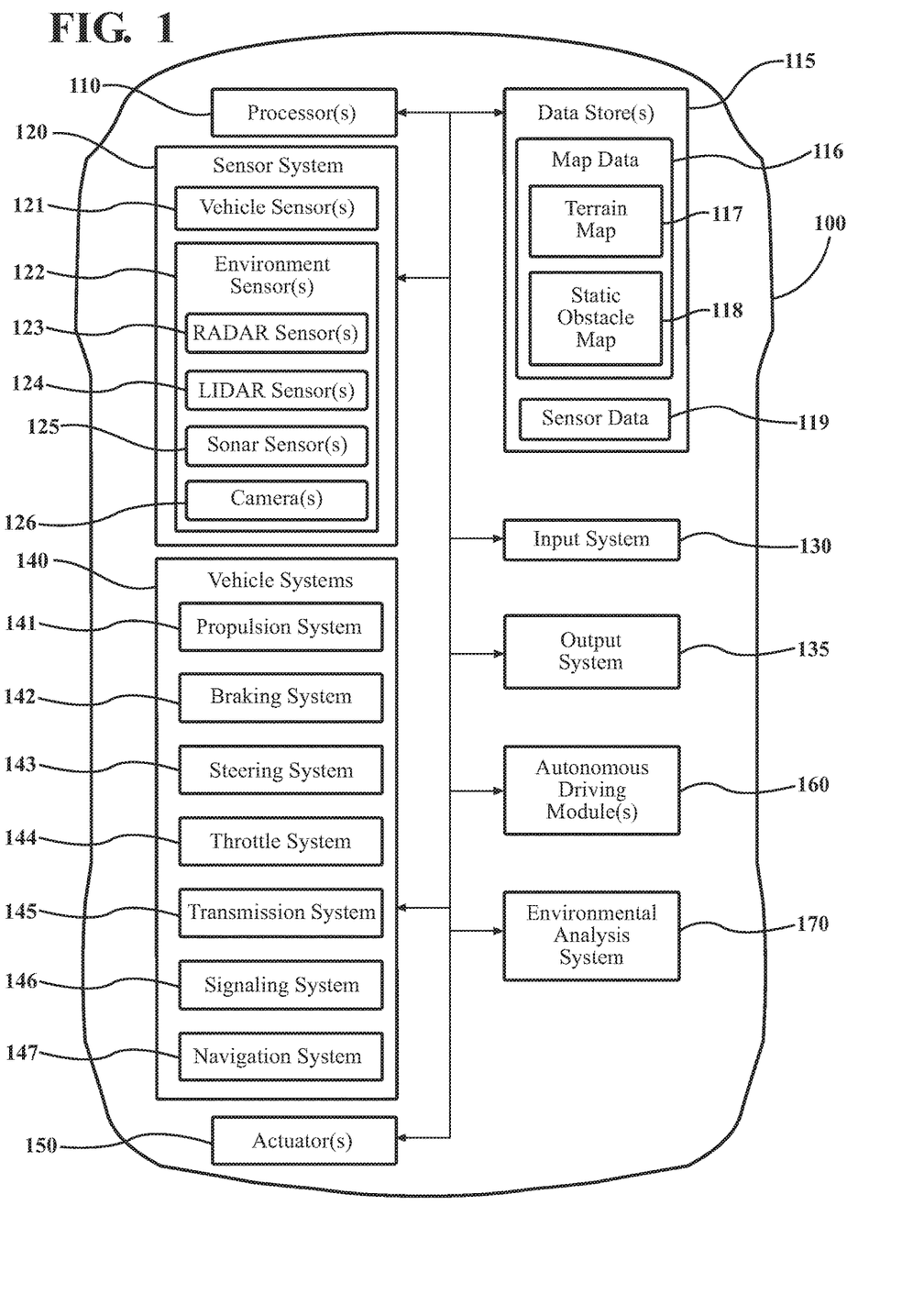
FIG. 1 illustrates one embodiment of a vehicle within which systems and methods disclosed herein may be implemented.

The principles of the embodiments described herein can be applied to a variety of robots, but vehicles will be used as illustrative examples. Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements. The vehicle 100 includes an environmental analysis system 170 that is implemented to, among other things, detect objects in the vehicle's environment.

Figure 2:
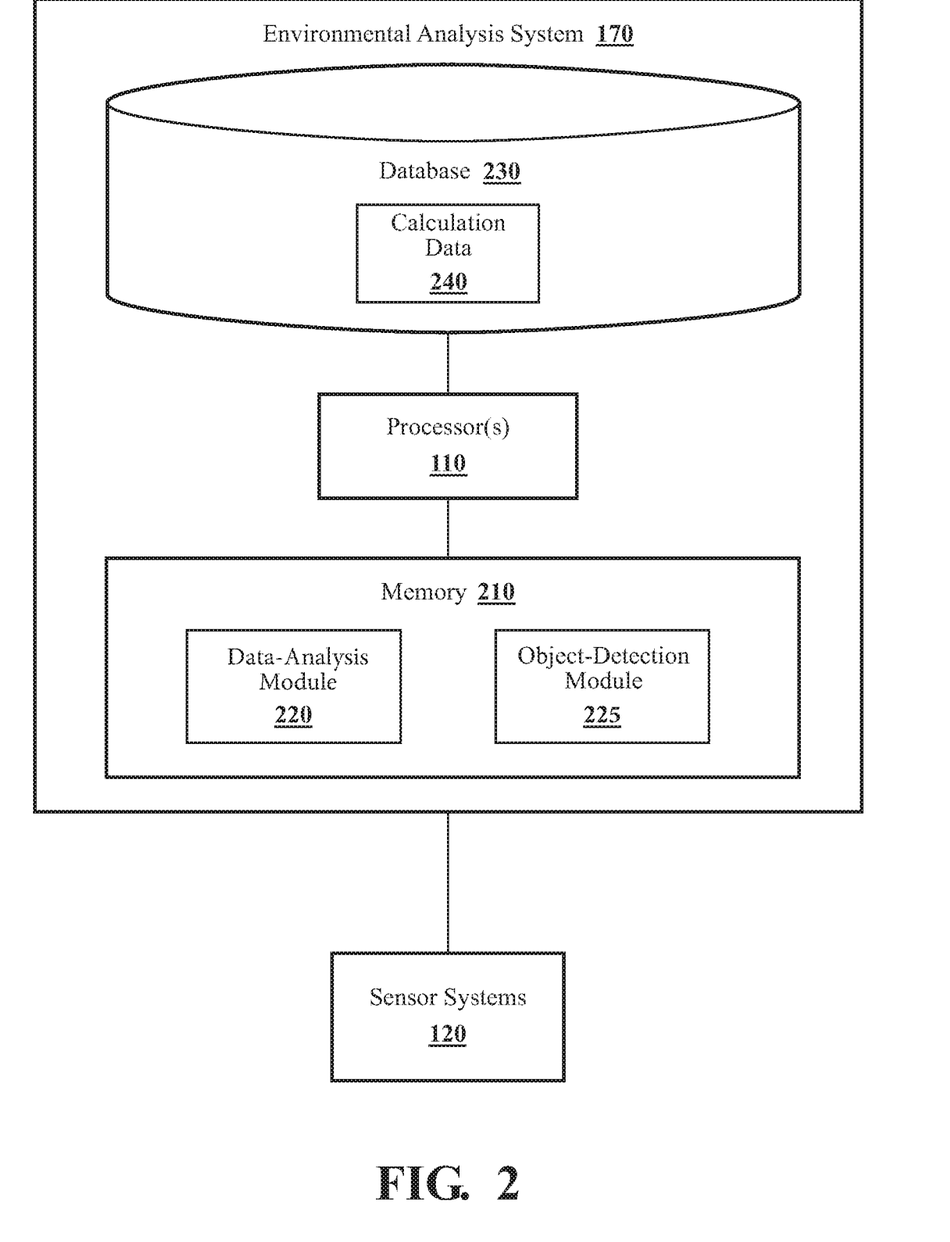
FIG. 2 illustrates one embodiment of an environmental analysis system.

With reference to FIG. 2, one embodiment of the environmental analysis system 170 of FIG. 1 is further illustrated. The environmental analysis system 170 is shown as including one or more processors 110 from the vehicle 100 of FIG. 1. Accordingly, the one or more processors 110 may be a part of the environmental analysis system 170, the environmental analysis system 170 may include one or more separate processors from the one or more processors 110 of the vehicle 100, or the environmental analysis system 170 may access the one or more processors 110 through a data bus or another communication path, depending on the embodiment. In one embodiment, the environmental analysis system 170 includes a memory 210 that stores a data-analysis module 220 and an object-detection module 225. In other embodiments, environmental analysis system 170 includes additional modules (not shown in FIG. 2) besides data-analysis module 220 and object-detection module 225 that relate to various aspects of analyzing the environment surrounding vehicle 100. The memory 210 is a random-access memory (RAM), read-only memory (ROM), a hard-disk drive, a flash memory, or other suitable memory for storing data-analysis module 220 and object-detection module 225. Data-analysis module 220 and object-detection module 225 include, for example, computer-readable instructions that when executed by the one or more processors 110, cause the one or more processors 110 to perform the various functions disclosed herein.

The environmental analysis system 170 receives three-dimensional (3D) data points from one or more sensors in sensor system 120 that emit a plurality of light beams. In one embodiment, those sensors include one or more LIDAR sensors (see Element 124 in FIG. 1). The one or more LIDAR sensors can produce a collection of 3D data points for a scene that those skilled in the art sometimes refer to as a "point cloud."

As shown in FIG. 2, calculation data 240 (point-cloud data, error and loss functions, etc.) associated with data-analysis module 220 and object-detection module 225 can be stored in database 230.

Data-analysis module 220 generally includes instructions to analyze 3D data points to distinguish points that lie in a ground plane (inlier points) from those associated with objects (outlier points). One aspect of data-analysis module 220 is receiving a plurality of three-dimensional (3D) data points from a plurality of light beams emitted by one or more sensors, as discussed above. Another aspect of data-analysis module 220 is identifying, among the plurality of 3D data points, a first set of inlier points and a first set of outlier points. The first set of inlier points satisfy a first predetermined error condition with respect to a plane hypothesis, and the first set of outlier points fail to satisfy the first predetermined error condition. Another aspect of data-analysis module 220 is identifying, among the first set of inlier points, a second set of outlier points. The second set of outlier points fail to satisfy a second predetermined error condition in the range domain of the sensors with respect to a plurality of line hypotheses corresponding, respectively, to the plurality of light beams. The particular error conditions can be determined by empirically examining the detection results, which are affected by the general smoothness of the LIDAR observations on the roadway. The size of the objects that the system needs to detect can also be taken into account. These aspects of data-analysis module 220 are discussed in greater detail below.

Figure 3:
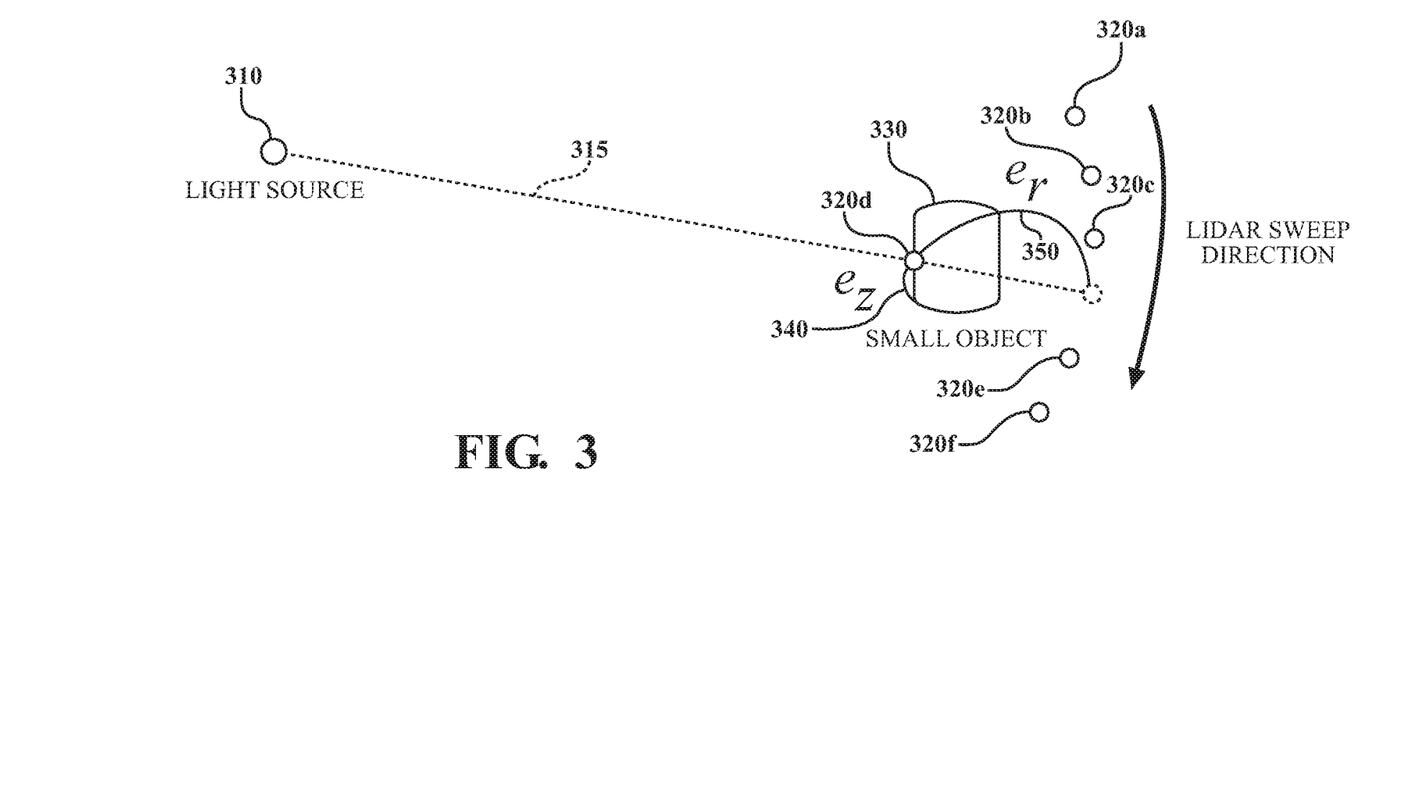
FIG. 3 illustrates an example of detecting an object using a LIDAR sensor, in accordance with an illustrative embodiment of the invention.

FIG. 3 illustrates an example of detecting an object using a LIDAR sensor, in accordance with an illustrative embodiment of the invention. In FIG. 3, light source 310 (e.g., a LIDAR sensor 124) emits a light beam 315, which sweeps across the ground in the direction indicated in FIG. 3, resulting in 3D data points 320a-f. In this example, the 3D data points 320a-c and 3203e-f may be termed "ground hits" because they lie in a ground plane. The 3D data point 320d, however, occurs on the surface of a small object 330. The difference in z component (vertical height) between the 3D data point 320d and the ground plane in which the ground hits lie is shown in FIG. 3 as $e_z$, the z-domain error 340. Had the object 330 not been present, 3D data point 320d would have been located on the ground (in the ground plane) along the same arc as the other ground hits (3D data points 320a-c and 3203e-f). The difference in range (line-of-sight distance to light source 310) between the expected location of 3D data point 320d on the ground and its actual location on the surface of object 330 is shown in FIG. 3 as $e_r$, the range-domain error 350.

Either type of error or difference measurement shown in FIG. 3, $e_z$ or $e_r$, can be used to detect outlier points—points that do not lie in the ground plane. Such points can correspond to objects on the ground, including small objects. Thus, outlier points identified via either error measurement (z-domain or range-domain) can be the basis for detecting an object. As mentioned above, using both error measurements jointly can have the advantage, in at least some embodiments, of detecting objects, particularly small objects, more reliably. These concepts are discussed in further detail in connection with FIG. 4.

Figure 4:
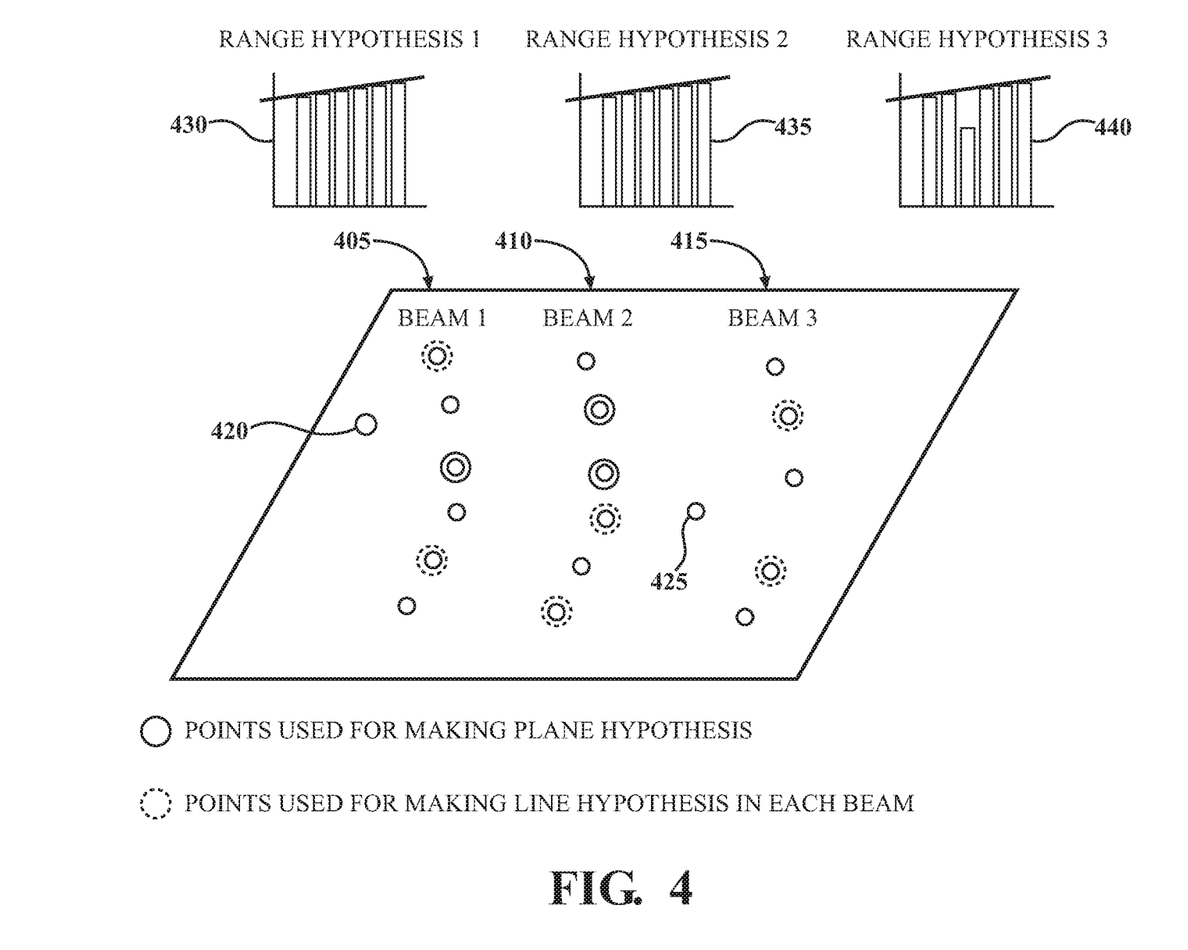
FIG. 4 illustrates identifying outlier points in the z domain and the range domain, in accordance with an illustrative embodiment of the invention.

FIG. 4 illustrates detecting outlier points in the z domain and the range domain, in accordance with an illustrative embodiment of the invention. FIG. 4 shows points 405 from Beam 1, points 410 from Beam 2, and points 415 from Beam 3. Point 420 is an example of an outlier point in the z domain. Point 425 is an example of an outlier point in the range domain (objects are not shown in FIG. 4 for simplicity). Also shown in FIG. 4 are bar graphs 430, 435, and 440 of the corresponding range-domain error $e_r$ for Beams 1, 2, and 3, respectively.

In the embodiment of FIG. 4, data-analysis module 220 employs a joint z-domain and range-domain RANSAC algorithm. This algorithm can be summarized as follows:

1. Select three random 3D data points and form a plane hypothesis for the ground plane (examples of such points are indicated in FIG. 4). The z component of a point j on the hypothesized plane can be expressed as $\hat{z}(j)=\alpha x(j)+\beta y(j)+\gamma$, where α, β, and γ are the plane model parameters. For each 3D data point j, compute the z-domain error $e_z(j)=1$, if $|z(j)-\hat{z}(j)|<\varepsilon_z$, and zero otherwise, where z(j) is the measured z component of a point j and $\varepsilon_z$ is a predetermined threshold or tolerance for the z-domain error. The loss function for the z domain can be expressed as $L_z=-\Sigma_j e_z(j)$.
2. Identify as inlier points the 3D data points that satisfy the above error condition $|z(j)-\hat{z}(j)|<\varepsilon_z$. Identify the remaining 3D data points as outlier points.
3. For the 3D data points belonging to a given beam i, perform the following:
    a. Select two random 3D data points and form a line hypothesis for the beam i in the range domain (examples of such points for each of the three beams are indicated in FIG. 4). The range for a point j along the hypothesized line can be expressed as $\hat{r}(j)=a_i \cdot j + b_i$, where $a_i$ and $b_i$ are line model parameters for beam i.
    b. For each 3D data point j in the beam i, compute the range-domain error $e_r(j)=1$, if $|r(j)-\hat{r}(j)|<\varepsilon_r$, and zero otherwise, where r(j) is the measured range for the point j and $\varepsilon_r$ is a predetermined threshold or tolerance for the range-domain error. The loss function for the range domain can be expressed as $L_r=-\Sigma_j e_r(j)$.
    c. Identify as inlier points the 3D data points in the beam that satisfy the above error condition $|r(j)-\hat{r}(j)|<\varepsilon_r$. Identify the remaining points in the beam as outlier points.
    d. Repeat Steps 3(a)-(c) above until the loss function $L_r$ no longer decreases for the current beam i.
    e. Repeat Step 3 until all beams i have been processed in the range domain.
4. Compute the overall or total loss function $L_T=-\Sigma_j(e_z(j)+e_r(j))$.
5. Repeat Steps 1-4 above until the total loss function $L_T$ no longer decreases.

Object-detection module 225 generally includes instructions to detect an object based, at least in part, on a first set of outlier points (those identified in the z domain), a second set of outlier points (those identified in the range domain), or both. In some embodiments, object-detection module 225 bases the detection of an object, at least in part, on the outlier points obtained from the algorithm discussed above in connection with FIG. 4. Note that, in the above illustrative algorithm, the total loss function $L_T$ is a negated summation of the two error functions for the z domain and the range domain. Each of those individual error functions is, in the above embodiment, a count of the number of inliers with respect to the z domain or the range domain. Therefore, the total loss function $L_T$, in this embodiment, is a negated summation of the total number of inlier points with respect to the z domain and the range domain combined.

Another way to conceptualize the algorithm discussed above is classifying 3D data points as being associated with the detected ground plane (inlier points) or as being associated with one or more non-ground objects (outlier points).

Figure 5:
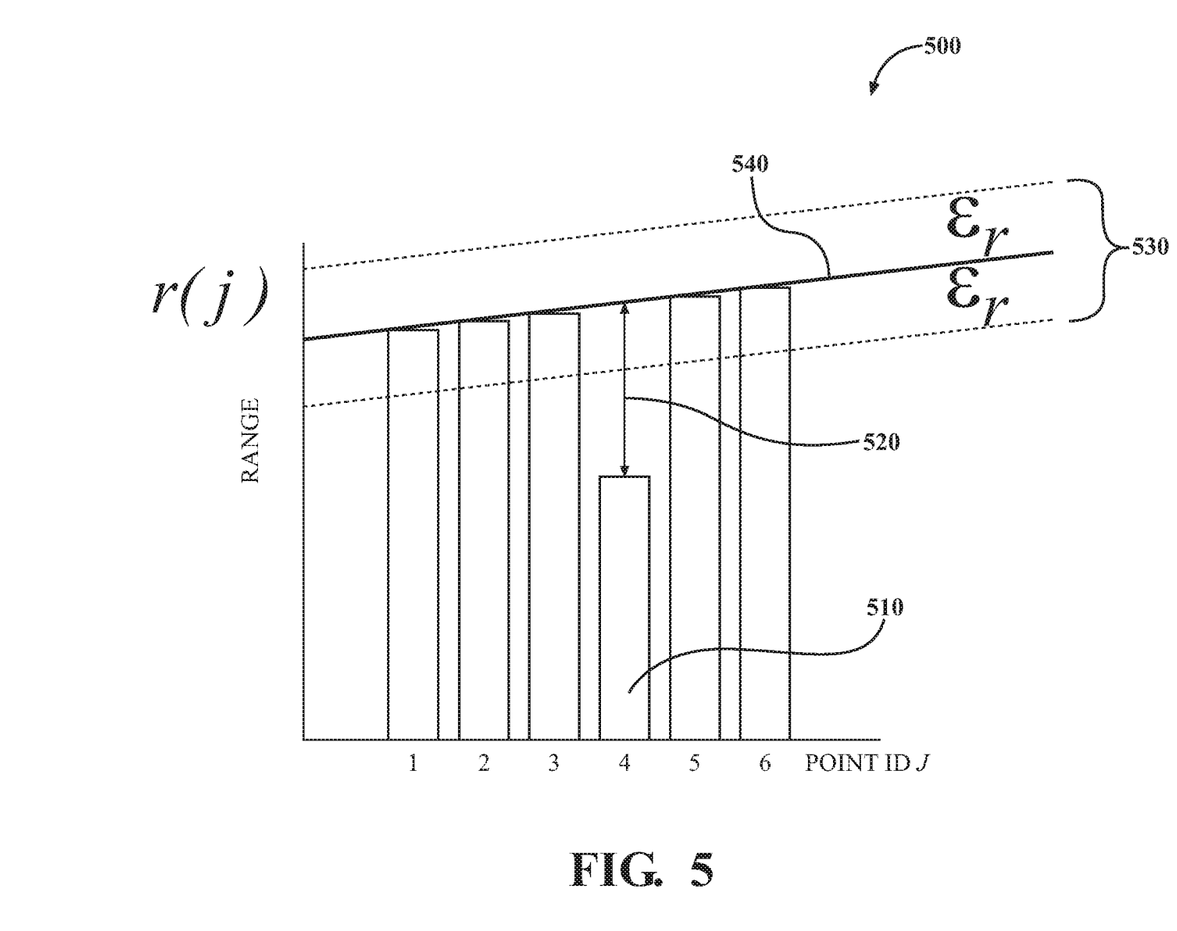
FIG. 5 is a bar graph of a range-domain error function, in accordance with an illustrative embodiment of the invention.

FIG. 5 is a bar graph 500 of a range-domain error function, in accordance with an illustrative embodiment of the invention. FIG. 5 is an example of applying the error condition in the range domain discussed above to identify inlier points and outlier points. In FIG. 5, a point with index 4 has a measured range 510. With respect to the hypothesized line 540 for beam i, that point has a range-domain error 520. As illustrated, that error falls outside the error envelope 530 specified by the threshold/tolerance $\varepsilon_r$, meaning that the point with index 4 in FIG. 5 is an outlier point with respect to the range domain. As explained above, such an outlier point in the range domain can be helpful in identifying small objects that would be missed otherwise with a z-domain-only approach. The other points with indexes 1-3 and 5-6 illustrated in FIG. 5 are inlier points because their measured range, compared with the hypothesized line 540, falls within the error envelope 530.

Figure 6:
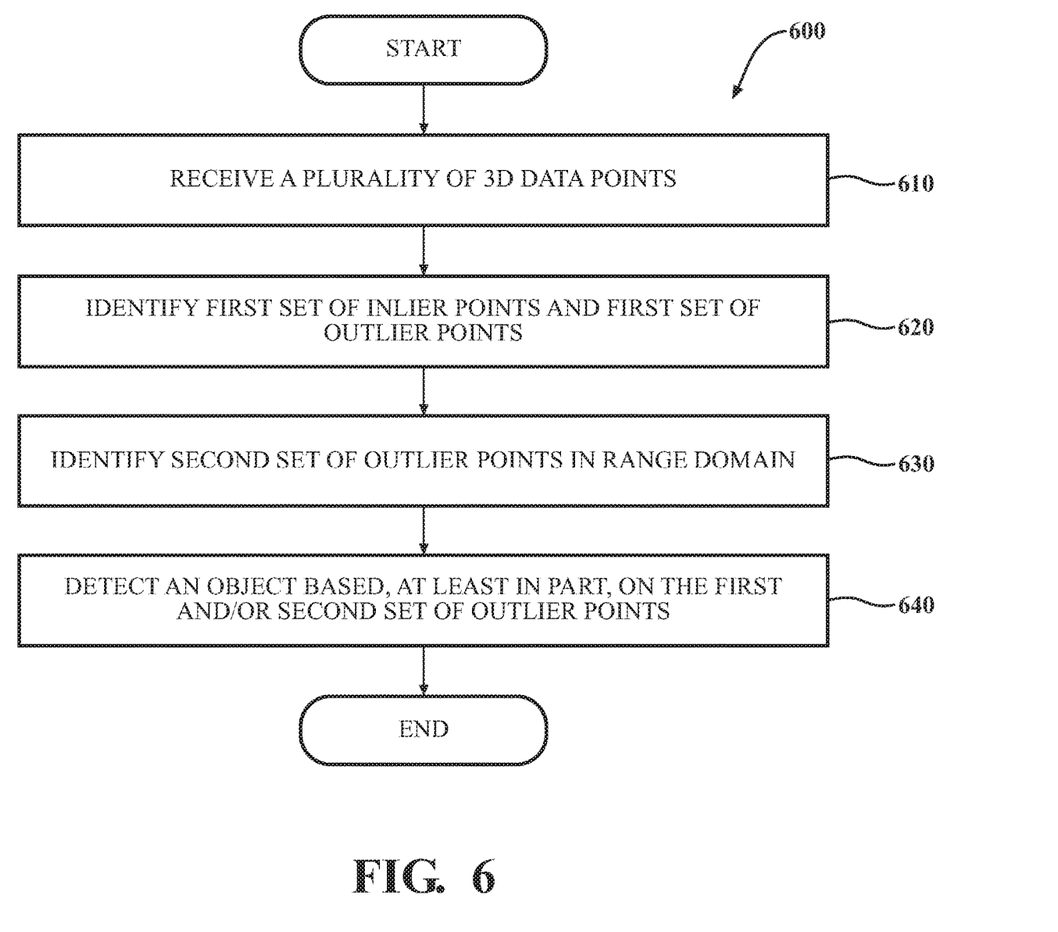
FIG. 6 is a flowchart of a method of detecting objects, in accordance with an illustrative embodiment of the invention.

FIG. 6 is a flowchart of a method 600 of detecting objects, in accordance with an illustrative embodiment of the invention. Method 600 will be discussed from the perspective of environmental analysis system 170 in FIG. 2. While method 600 is discussed in combination with environmental analysis system 170, it should be appreciated that method 600 is not limited to being implemented within environmental analysis system 170, but environmental analysis system 170 is instead one example of a system that may implement method 600.

At block 610, data-analysis module 220 receives a plurality of 3D data points from a plurality of light beams emitted by one or more sensors. As explained above, in some embodiments, the one or more sensors include at least one LIDAR sensor 124.

At block 620, data-analysis module 220 identifies, among the plurality of 3D data points, a set of inlier points and a set of outlier points in the z domain with respect to a hypothesized ground plane. In some embodiments, the plane hypothesis is formed based on three randomly selected points among the 3D data points (see FIG. 4). The inlier points are those that satisfy a predetermined z-domain error condition relative to the plane hypothesis, and the outlier points are those that fail to satisfy this predetermined error condition, as discussed above in connection with FIG. 4.

At block 630, data-analysis module 220 identifies, among the inlier points identified in block 620, another set of outlier points. These additional outlier points are those that fail to satisfy a predetermined error condition in the range domain. As explained above in connection with FIG. 4, that predetermined error condition in the range domain is computed with respect to a plurality of line hypotheses corresponding, respectively, to the plurality of light beams emitted by the sensors. In some embodiments, the line hypothesis for a given beam is formed based on two randomly selected points from that beam (see FIG. 4).

At block 640, object-detection module 225 detects an object based, at least in part, on the outlier points identified in the z domain, the outlier points identified in the range domain, or both. As discussed above, one advantage of at least some embodiments is that smaller objects (e.g., 1 or 2 cm in vertical height above the ground) can be detected using a combination of the z-domain and range-domain processing techniques discussed above. In some embodiments, 3D data points are classified as being associated with a ground plane or being associated with one or more non-ground objects. The outlier points, whether they are identified in the z domain or the range domain, correspond to the latter category.

Figure 7:
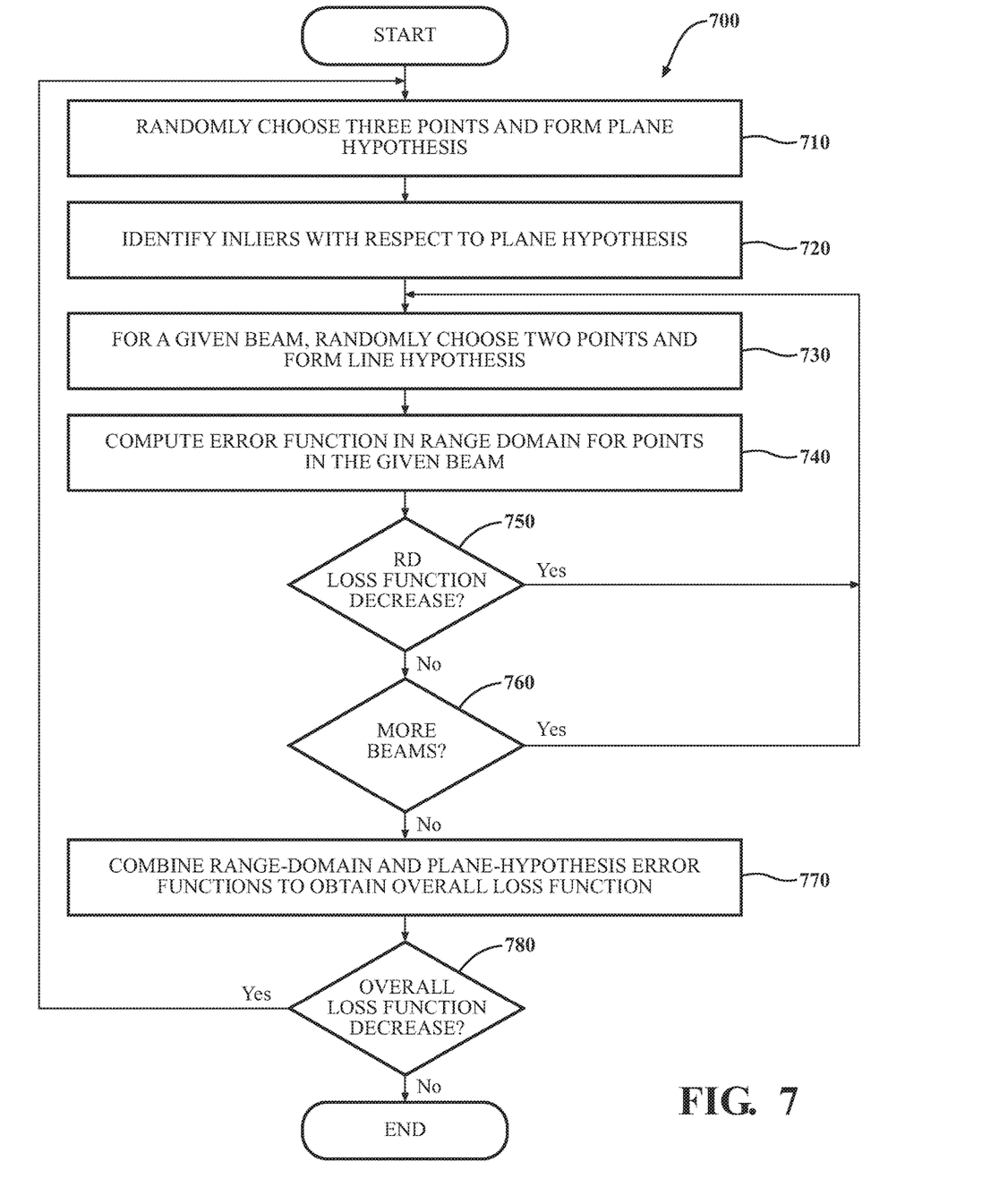
FIG. 7 is a flowchart of a method of detecting objects, in accordance with another illustrative embodiment of the invention.

FIG. 7 is a flowchart of a method 700 of detecting objects, in accordance with another illustrative embodiment of the invention. Method 700 will be discussed from the perspective of environmental analysis system 170 in FIG. 2. While method 700 is discussed in combination with environmental analysis system 170, it should be appreciated that method 700 is not limited to being implemented within environmental analysis system 170, but environmental analysis system 170 is instead one example of a system that may implement method 700. Note that FIG. 7 corresponds to the iterative algorithm summarized in connection with FIG. 4 above. Method 700 adds an iterative aspect to method 600 discussed above in connection with FIG. 6. In some embodiments, method 700 corresponds to a joint z-domain and range-domain RANSAC algorithm.

At block 710, data-analysis module 220 randomly chooses three points among the 3D data points to form a plane hypothesis, as explained above. At block 720, data-analysis module 220 identifies the inlier points with respect to the plane hypothesis (in the z domain). At block 730, for each of a plurality of light beams from the one or more sensors, data-analysis module 220 randomly chooses two points to form a line hypothesis for that beam. At block 740, data-analysis module 220 computes an error function in the range domain for the points in the current beam. If the loss function $L_r$ for the range domain decreases relative to the previous iteration for the current beam, control returns to block 730 at decision block 750. Otherwise, control proceeds to decision block 760. If there are more beams to process at decision block 760, control returns to block 730. Otherwise, control proceeds to block 770, where data-analysis module 220 combines and negates the z-domain and range-domain error functions to obtain the total loss function $L_T$, as discussed above. If the total loss function $L_T$ decreases relative to the previous iteration at decision block 780, control returns to block 710. Otherwise, convergence has been achieved, and the method terminates.

Object-detection module 225 can use the results of method 700 to detect an object based, at least in part, on the outlier points identified in the z domain, the outlier points identified in the range domain, or both, as explained above.

One application for the techniques described herein (e.g., the algorithm discussed above in connection with FIG. 4) is to create ground-truth data that supports active learning techniques for identifying and labeling detected objects. For example, the algorithm, in some embodiments, can be used to pre-filter 3D data points that are subsequently labeled as a small object based on an analysis that includes deep machine learning.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on. The results of the detection obtained using LIDAR can be combined with data from those other sensors to increase the accuracy of detection and tracking.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the environmental analysis system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the environmental analysis system 170, and/or the autonomous driving module(s) 160 may control some or all of these vehicle systems 140 and, thus, may be partially or fully autonomous.

The processor(s) 110, the environmental analysis system 170, and/or the autonomous driving module(s) 160 can be operably connected to communicate with the various vehicle systems 140 and/or individual components thereof. For example, returning to FIG. 1, the processor(s) 110, the environmental analysis system 170, and/or the autonomous driving module(s) 160 can be in communication to send and/or receive information from the various vehicle systems 140 to control the movement, speed, maneuvering, heading, direction, etc. of the vehicle 100. The processor(s) 110, the environmental analysis system 170, and/or the autonomous driving module(s) 160 may control some or all of these vehicle systems 140.

The processor(s) 110, the environmental analysis system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the environmental analysis system 170, and/or the autonomous driving module(s) 160 can control the direction and/or speed of the vehicle 100. The processor(s) 110, the environmental analysis system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the environmental analysis system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for detecting objects, the system comprising: one or more sensors that emit a plurality of light beams; one or more processors; and a memory communicably coupled to the one or more processors and storing: a data-analysis module including instructions that when executed by the one or more processors cause the one or more processors to: receive a plurality of three-dimensional (3D) data points from the plurality of light beams; identify, among the plurality of 3D data points, a first set of inlier points and a first set of outlier points, the first set of inlier points satisfying a first predetermined error condition with respect to a plane hypothesis, the first set of outlier points failing to satisfy the first predetermined error condition; identify, among the first set of inlier points, a second set of outlier points, the second set of outlier points failing to satisfy a second predetermined error condition in a range domain of the one or more sensors with respect to a plurality of line hypotheses corresponding, respectively, to the plurality of light beams; and repeat iteratively identifying, among the plurality of 3D data points, the first set of inlier points and the first set of outlier points and identifying, among the first set of inlier points, the second set of outlier points until a loss function ceases to decrease; and an object-detection module including instructions that when executed by the one or more processors cause the one or more processors to detect an object based, at least in part, on at least one of the first set of outlier points and the second set of outlier points.

2. The system of claim 1, wherein the one or more sensors include a Light Detection and Ranging (LIDAR) sensor.

3. The system of claim 1, wherein the loss function is a negated summation of a first error function associated with the first predetermined error condition and a second error function associated with the second predetermined error condition.

4. The system of claim 3, wherein the instructions included in the object-detection module to detect the object based, at least in part, on at least one of the first set of outlier points and the second set of outlier points include instructions to classify the first set of outlier points and the second set of outlier points as being associated with one or more non-ground objects.

5. The system of claim 3, wherein the first error function is a count of a number of points in the first set of inlier points and the second error function is a count of a number of points in a second set of inlier points, the second set of inlier points satisfying the second predetermined error condition in the range domain of the one or more sensors with respect to the plurality of line hypotheses corresponding, respectively, to the plurality of light beams.

6. The system of claim 1, wherein the data-analysis module includes further instructions that cause the one or more processors to: select randomly three 3D data points from the plurality of 3D data points to construct the plane hypothesis.

7. The system of claim 1, wherein the data-analysis module includes further instructions that cause the one or more processors to: select randomly, from the first set of inlier points, two 3D data points obtained from a given light beam in the plurality of light beams to construct the line hypothesis corresponding to the given light beam.

8. A non-transitory computer-readable medium for detecting objects and storing instructions that when executed by one or more processors cause the one or more processors to: receive a plurality of three-dimensional (3D) data points from a plurality of light beams emitted by one or more sensors; identify, among the plurality of 3D data points, a first set of inlier points and a first set of outlier points, the first set of inlier points satisfying a first predetermined error condition with respect to a plane hypothesis, the first set of outlier points failing to satisfy the first predetermined error condition; identify, among the first set of inlier points, a second set of outlier points, the second set of outlier points failing to satisfy a second predetermined error condition in a range domain of the one or more sensors with respect to a plurality of line hypotheses corresponding, respectively, to the plurality of light beams;

repeat iteratively identifying, among the plurality of 3D data points, the first set of inlier points and the first set of outlier points and identifying, among the first set of inlier points, the second set of outlier points until a loss function ceases to decrease;

and detect an object based, at least in part, on at least one of the first set of outlier points and the second set of outlier points.

9. The non-transitory computer-readable medium of claim 8, wherein the loss function is a negated summation of a first error function associated with the first predetermined error condition and a second error function associated with the second predetermined error condition.

10. The non-transitory computer-readable medium of claim 8, wherein the instructions that cause the one or more processors to detect the object based, at least in part, on at least one of the first set of outlier points and the second set of outlier points include instructions to classify the first set of outlier points and the second set of outlier points as being associated with one or more non-ground objects.

11. A method of detecting objects, the method comprising: receiving a plurality of three-dimensional (3D) data points from a plurality of light beams emitted by one or more sensors; identifying, among the plurality of 3D data points, a first set of inlier points and a first set of outlier points, the first set of inlier points satisfying a first predetermined error condition with respect to a plane hypothesis, the first set of outlier points failing to satisfy the first predetermined error condition; identifying, among the first set of inlier points, a second set of outlier points, the second set of outlier points failing to satisfy a second predetermined error condition in a range domain of the one or more sensors with respect to a plurality of line hypotheses corresponding, respectively, to the plurality of light beams;
repeating iteratively the identifying, among the plurality of 3D data points, the first set of inlier points and the first set of outlier points and the identifying, among the first set of inlier points, the second set of outlier points until a loss function ceases to decrease; and detecting an object based, at least in part, on at least one of the first set of outlier points and the second set of outlier points.

12. The method of claim 11, further comprising labeling the object based on an analysis that includes deep machine learning.

13. The method of claim 11, wherein the loss function is a negated summation of a first error function associated with the first predetermined error condition and a second error function associated with the second predetermined error condition.

14. The method of claim 13, wherein the first error function is a count of a number of points in the first set of inlier points and the second error function is a count of a number of points in a second set of inlier points, the second set of inlier points satisfying the second predetermined error condition in the range domain of the one or more sensors with respect to the plurality of line hypotheses corresponding, respectively, to the plurality of light beams.

15. The method of claim 11, wherein detecting the object based, at least in part, on at least one of the first set of outlier points and the second set of outlier points includes classifying the first set of outlier points and the second set of outlier points as being associated with one or more non-ground objects.

16. The method of claim 11, further comprising: selecting randomly three 3D data points from the plurality of 3D data points to construct the plane hypothesis.

17. The method of claim 11, further comprising: selecting randomly, from the first set of inlier points, two 3D data points obtained from a given light beam in the plurality of light beams to construct the line hypothesis corresponding to the given light beam.

* * * * *